(12) United States Patent
Sotiriou

(10) Patent No.: US 7,462,993 B2
(45) Date of Patent: Dec. 9, 2008

(54) DOME LIGHT

(76) Inventor: George Sotiriou, 42 Academy St., Farmingville, NY (US) 11772

( * ) Notice: Subject to any disclaimer, the term of this patent is extended or adjusted under 35 U.S.C. 154(b) by 442 days.

(21) Appl. No.: 11/164,009

(22) Filed: Nov. 7, 2005

(65) Prior Publication Data

US 2007/0103099 A1   May 10, 2007

(51) Int. Cl.
*G05F 1/00* (2006.01)
(52) U.S. Cl. .................... 315/291; 315/307; 315/209 R; 315/312; 362/12; 362/227; 362/545; 362/470
(58) Field of Classification Search ................ 315/291, 315/307, 312, 209 R, 225; 362/12, 228, 362/470, 471, 545, 555, 548, 800, 227
See application file for complete search history.

(56) References Cited

U.S. PATENT DOCUMENTS

| | | | |
|---|---|---|---|
| 3,816,739 A | 6/1974 | Stolov | 240/10 R |
| 4,677,533 A | 6/1987 | McDermott | 362/240 |
| 5,803,579 A * | 9/1998 | Turnbull et al. | 362/516 |
| 5,984,494 A | 11/1999 | Chapman | 362/470 |
| 6,655,752 B2 * | 12/2003 | Robertson et al. | 303/20 |
| 6,702,452 B2 * | 3/2004 | Jigamian et al. | 362/205 |
| 6,858,994 B2 * | 2/2005 | Vollrath | 315/200 A |
| 6,948,830 B1 | 9/2005 | Petrick | 362/229 |
| 6,962,423 B2 * | 11/2005 | Hamilton et al. | 362/12 |

* cited by examiner

*Primary Examiner*—Haissa Philogene
(74) *Attorney, Agent, or Firm*—Brake Hughes Bellermann LLP; Shane A. Kennedy

(57) ABSTRACT

A dome light is disclosed which utilizes a rotating knob with 'on' and 'off' positions to toggle between having either a halogen bulb on or a plurality of red LEDs on, or both off. Dual D-type flip-flops toggle the dome light between states in response the changes of the knob between the 'on' and 'off' positions. The plurality of red LEDs utilize at least one current regulator to maintain a constant level of illumination. When the halogen bulb is on, further rotation of the knob varies a potentiometer which controls the duty cycle created by a pulse width modulator. The pulse width modulator causes the halogen bulb to be on for portions of each cycle; the longer the 'on' time during each cycle, the greater the apparent intensity of illumination by the halogen bulb.

20 Claims, 7 Drawing Sheets

DOME LIGHT

BACKGROUND OF THE INVENTION

Night vision is of critical importance for anyone who needs to see unaided at night. For example, a person at the helm of a boat at night needs to be able to pick out navigational aids on the water and still read the compass and other instruments in front of him.

Halogen lamps provide broad band spectral radiation ranging from the ultraviolet through the visible and into the infrared. This broad band of radiation is similar to that emitted by the sun, and is the most comfortable lighting to read with. However, the presence of this broad band of radiation will cause a person's pupils to narrow, rendering a person on a boat at night unable to clearly see things not illuminated by the halogen lamp. For night vision, red light-emitting diodes (LEDs), which typically have narrow bands of spectral radiation around 620 nm, are ideal. This is because the human eye is least sensitive to red light, and the pupil will remain wide open in response to red light, allowing the eye to remain acclimated to the night and see outside the area illuminated by the red light.

SUMMARY OF THE INVENTION

A circuit which may be installed on the ceiling of the helm of a boat utilizes a bulb emitting white light, and in one embodiment, the bulb is a halogen bulb which is controlled by a switch utilizing a pulse width modulator. The pulse width modulator comprises operational amplifiers and a potentiometer to dim the apparent illumination intensity of the halogen lamp by converting a DC input into an AC power source for the halogen bulb, turning the halogen bulb on for portions of each cycle. The potentiometer may be controlled by turning a rotating knob, which varies the intensity of illumination seen by a human eye. The use of a pulse width modulator causes very little power to be drawn away from the halogen bulb when the bulb is dimmed. In one embodiment, the light further comprises a plurality of light-emitting diodes. The light-emitting diodes may be red, which enables a human eye to view what the light-emitting diodes are illuminating, while still remaining acclimated to the night and able to see objects outside the area illuminated by the LEDs. Thus, a person may choose between the white light for reading and red light for safe night vision. In one embodiment, the circuit utilizes a switch and sequential logic with flip-flops to cycle the circuit through a five-step process consisting of three states: halogen bulb off and LEDs off, halogen bulb on and LEDs off, halogen bulb off and LEDs off, halogen bulb off and LEDs on, and back to the first state of halogen bulb off and LEDs off. The circuit could be used anywhere that needed white light for reading and red light for safe night vision, such as on boats, planes, tractors, or trains.

DETAILED DESCRIPTION OF THE PREFERRED EMBODIMENTS

One embodiment of the invented dome light 10 is a dome light which may be installed in the cabin at the helm of a boat. The dome light 10 uses a bulb that emits white light, which in this embodiment is a twenty-watt halogen bulb 114 which creates a comfortable light spectrum to read and relax with. The halogen bulb 114 has a two thousand-hour expected lifetime, and can be operated at reduced illumination levels using a dimmer controller. The halogen bulb 114 is ideal for viewing objects in the cabin at night; however, the broad spectrum of light created by the halogen bulb will cause a person's pupils to shrink, making it difficult for the person to see outside the cabin. To enable one to see instruments inside the cabin and still see outside the cabin, an embodiment of the dome light 10 comprises eight red light-emitting diodes (LEDs) 44, 46, 48, 50, 52, 54, 56, 58. With the halogen bulb 114 turned off and the red LEDs 44, 46, 48, 50, 52, 54, 56, 58, turned on, the dome light 10 will enable a person to see the instruments in front of him and still view objects outside the helm which are not illuminated by the red LEDs 44, 46, 48, 50, 52, 54, 56, 58.

Figure 1:
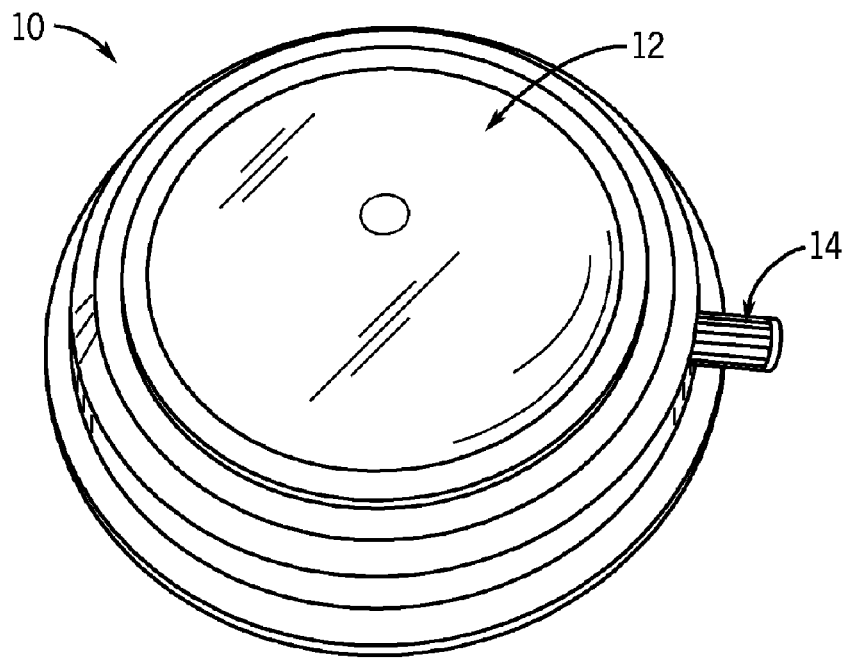
FIG. 1 shows a front perspective view of an embodiment of the invented dome light.

FIG. 1 shows an outside front view of an embodiment of the invented dome light 10. The components are enclosed in a glass lens 12 and a circular metal housing. The metal housing may be attached to the ceiling with bolts or screws. This embodiment of the dome light 10 also has a rotating knob 14 which rotates from an 'off' position to an 'on' position, and while in the 'on' position, further rotates to enable dimming of the halogen bulb 114. The existence of only two positions or modes for the knob 14 in this embodiment, 'off' and 'on', makes the dome light 114 easier to control than if it had, for example, three positions, which would make the knob 14 more difficult to control at night. The knob 14 could be replaced with a rotational potentiometer with 'push on', 'push off' modes, or a linear potentiometer with an on/off switch and achieve the same results.

Figure 2:
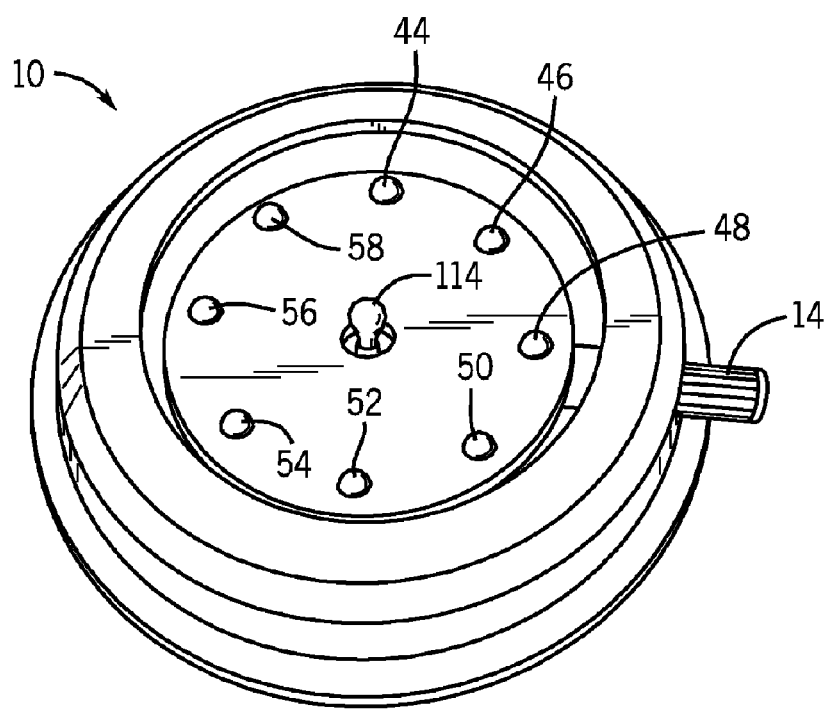
FIG. 2 shows a front perspective view of an embodiment of the invented dome light with the lens removed to show the light-emitting diodes and the halogen bulb.
Figure 3:
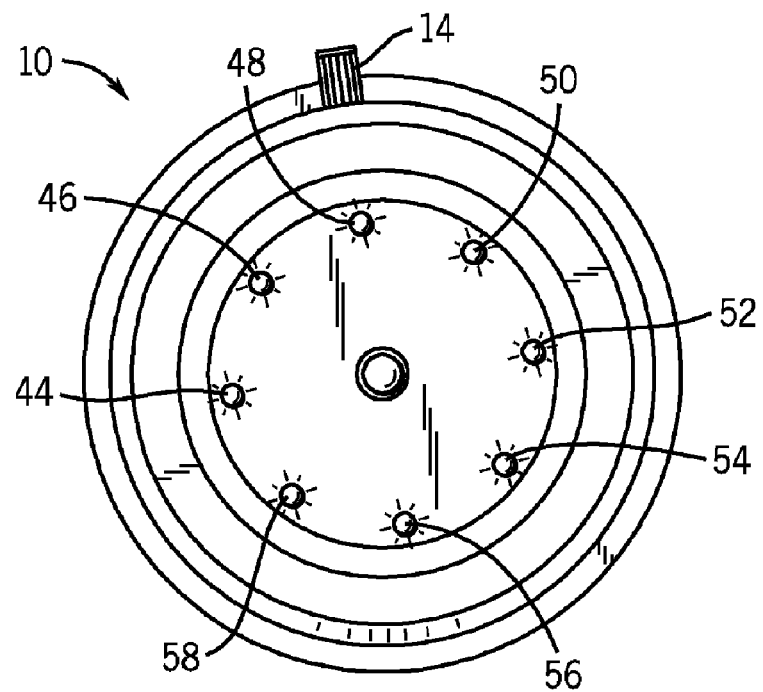
FIG. 3 shows a front view of an embodiment of the invented dome light with the lens removed and the red light-emitting diodes emitting red light.
Figure 4:
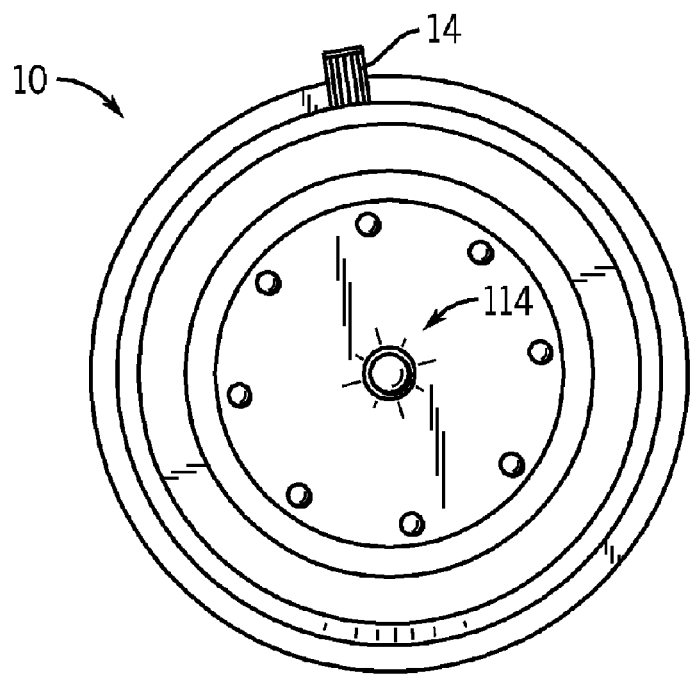
FIG. 4 shows a front view of an embodiment of the invented dome light with the lens removed and the halogen bulb emitting white light.
Figure 5:
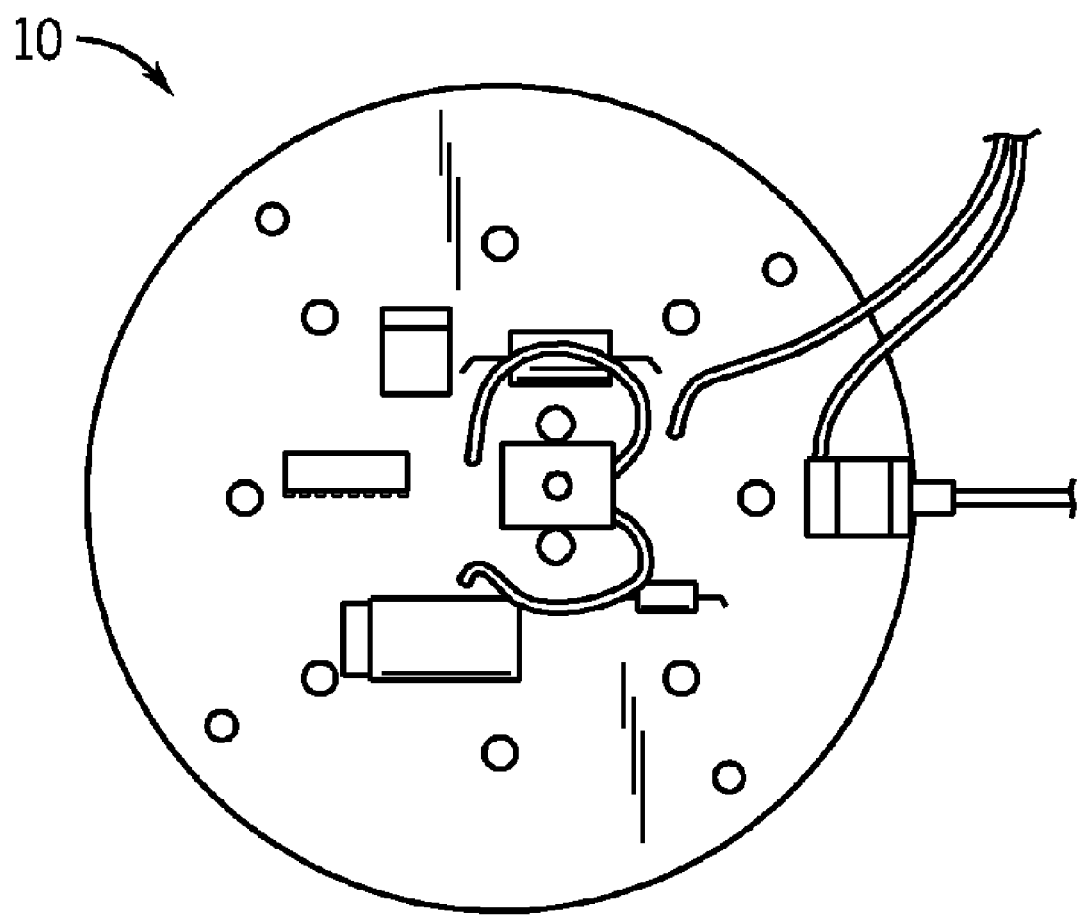
FIG. 5 shows a rear view of an embodiment of the invented dome light showing the circuitry.

FIGS. 2, 3, and 4 show front views of an embodiment of the invented dome light 10 without the glass lens 12. The halogen bulb 114 extends from the center of the dome light 10, and the red LEDs 44, 46, 48, 50, 52, 54, 56, 58, are arranged in a circular pattern around the halogen bulb 114. The circular pattern of the red LEDs 44, 46, 48, 50, 52, 54, 56, 58, allows them to emit light with an even pattern of intensity. FIG. 5 is a rear view of the dome light 10, and shows a physical embodiment of the circuitry used to perform the functions of the dome light 10.

FIGS. 6, 7, 8, and 9 are schematic diagrams of the circuitry used for the dome light 10. The switch 116 receives power from outside the circuit; the voltage applied to the switch is generally between ten and fifteen volts DC, and in one embodiment, is twelve volts DC from a battery supply. A lithium-ion battery could be incorporated as a backup, which would illuminate the red LEDs 44, 46, 48, 50, 52, 54, 56, 58, in the event power was lost from the first battery. The dotted line between the switch 116 and the potentiometer 96 shows the mechanical connection between the switch 116 and the potentiometer 96: the knob 14 rotates to turn the switch 116 from an off mode or open position to an on mode or closed position, and while the switch 116 is in the on mode or closed position, further rotation of the knob 14 varies the voltage potential of the first node 32 that is shared by the potentiometer 96 and pin 13 of the fourth operational amplifier 88 by varying the resistance of the potentiometer 96.

Figure 6:
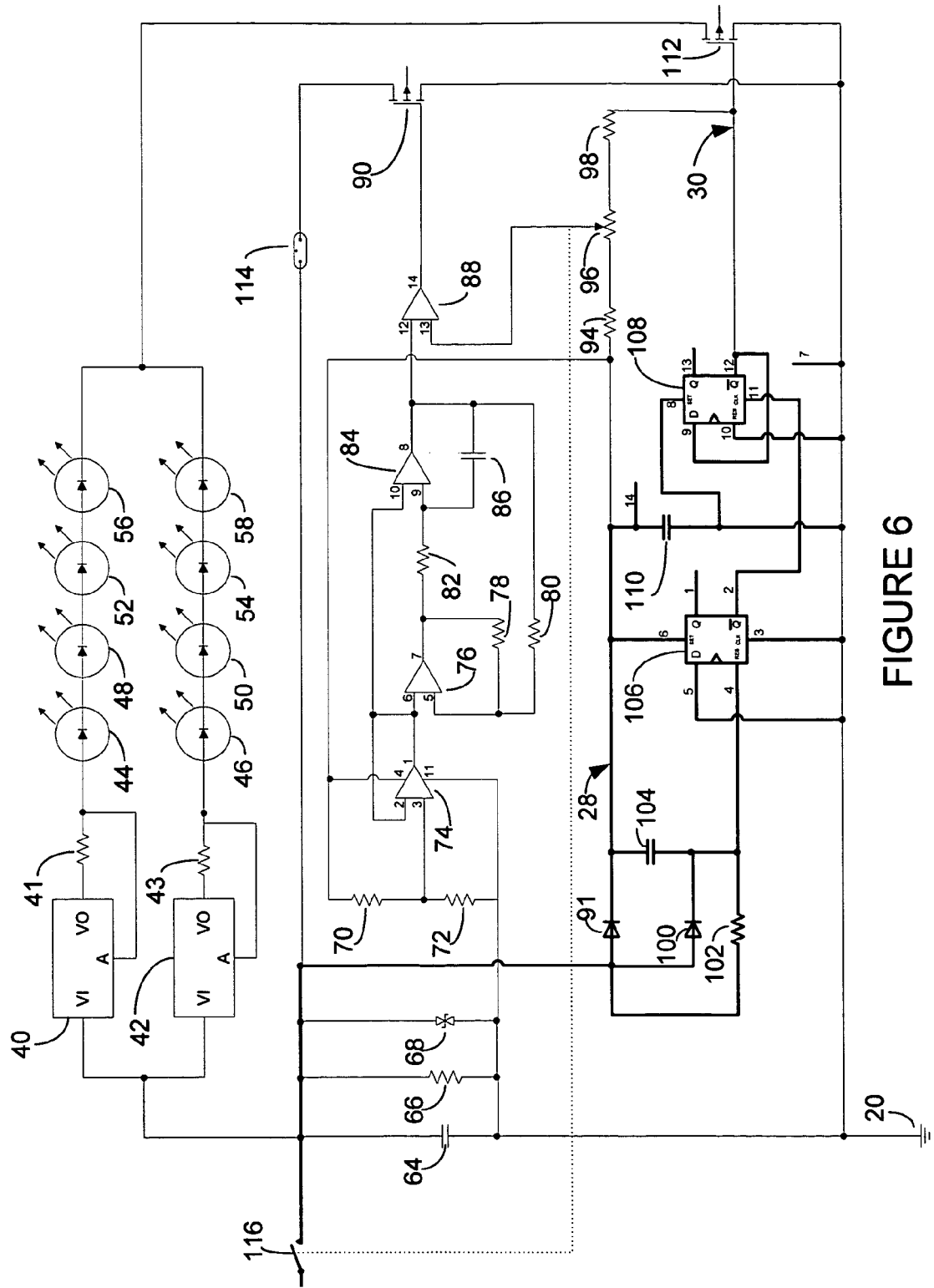
FIG. 6 is a schematic diagram of the circuitry of an embodiment of the invented dome light with bold lines showing the activity of the sequential logic sequence.

The sequential logic sequencing shown in FIG. 6 enables one embodiment of the dome light 10 to toggle between three states using only two modes of the switch 116, the two modes being on and off, and which correspond to the switch 116 being closed and open. The three states are halogen bulb 114 on and red LEDs 44, 46, 48, 50, 52, 54, 56, 58, off, halogen bulb 114 off and red LEDs 44, 46, 48, 50, 52, 54, 56, 58, on, and halogen bulb 114 off and red LEDs 44, 46, 48, 50, 52, 54, 56, 58, off. The order within the cycle in which these states will occur is halogen bulb 114 off and red LEDs 44, 46, 48, 50, 52, 54, 56, 58 off, halogen bulb 114 on and red LEDs 44, 46, 48, 50, 52, 54, 56, 58 off, halogen bulb 114 off and red LEDs 44, 46, 48, 50, 52, 54, 56, 58 off, halogen bulb 114 off and red LEDs 44, 46, 48, 50, 52, 54, 56, 58 on, halogen bulb 114 off and red LEDs 44, 46, 48, 50, 52, 54, 56, 58 off, and this cycle repeats.

The sequential logic system in the embodiment shown utilizes CMOS technology with a 4013 integrated circuit, which has dual D-type flip-flops 106, 108, to control the status of the halogen bulb 114 and the red LEDs 44, 46, 48, 50, 52, 54, 56, 58. Other types of flip-flops could also be used. The pin numbers used for connecting the 4013 integrated circuit are shown in FIGS. 6-9. The first flip-flop 106 is configured as a buffer. The 'set' input of the first flip-flop 106, pin 6, receives input and is charged through the first isolation diode 91, a high-speed switching diode with part number 1N4148 in one embodiment, in response to the on or off signal from the switch 116. The 'reset' input of the first flip-flop 106, pin 4, receives input and is charged through the second isolation diode 100, also a high-speed switching diode with part number 1N4148, whenever the switch 116 is closed. The 'data' input, pin 5, and 'clock' input, pin 3, are both connected to ground 20. The output signal $Q_-$, pin 2 of the first flip-flop 106, drives the 'clock' input, pin 11, of the second flip-flop 108.

The second flip-flop, 108, is configured as a T or "toggle" flip-flop, meaning that it changes its output on each clock edge, giving an output which is half the frequency of the input signal. The 'set' input, pin 8, and the 'reset' input, pin 10, are both connected to ground 20. The 'data' input, pin 9, and the $Q^-$ output, pin 12, share the second node 30, which is also shared by the second end of the second resistor 98, 1.96 kΩ, and the gate of the second MOSFET 112. Transistor types other than MOSFETs could also be used. The voltage potential of the second node 30, which is controlled by the $Q^-$ output, pin 12, of the second flip-flop 108, controls whether the red LEDs 44, 46, 48, 50, 52, 54, 56, 58, or the halogen bulb 114 may illuminate: for two changes in the position of the switch 116 (one open and one closed), the voltage potential of second node 30 will be high, turning the second MOSFET 112 on, and allowing current to flow through the red LEDs 44, 46, 48, 50, 52, 54, 56, 58, during the one of two switch 116 positions when the switch 116 is closed. While the voltage potential of second node 30 is high, no current may flow through the resistor divider network of the first resistor 94, potentiometer 96, and the second resistor 98, causing there to be no output from pin 14 of the fourth operational amplifier 88, turning the first MOSFET 90 and halogen bulb 114 off. For the next two changes in position of the switch 116, the $Q^-$ output, pin 12, of the second flip-flop 108 will be low, turning the second MOSFET 112 and the red LEDs 44, 46, 48, 50, 52, 54, 56, 58 off. When the switch 116 is closed, current may flow through the resistor divider network of the first resistor 94, potentiometer 96, and the second resistor 98, turning on the duty cycle of the pulse width modulator, and turning on the first MOSFET 90 and the halogen bulb 114 during the on portions of the duty cycle.

The second isolation diode 100, first capacitor 104, 0.15 μF, and third resistor 102, 100 kΩ, debounce the switch 116 contacts, ensuring a clean signal output from $Q^-$, pin 2.

The second capacitor 110, 120 μF, is charged through the first isolation diode 91 at the operating voltage, typically twelve volts, whenever the switch 116 is closed. When the switch 116 opens, the charge on the second capacitor 110 maintains power to pin 14, which powers the first and second flip-flops 106, 108, for approximately five seconds. Maintaining power to the second flip-flop 108 enables reliable toggling of the second flip-flop 108. The first isolation diode 91 prevents the second capacitor 110 from discharging through the eleventh resistor 66, through the halogen bulb 114, or through the red LEDs 44, 46, 48, 50, 52, 54, 56, 58.

Figure 7:
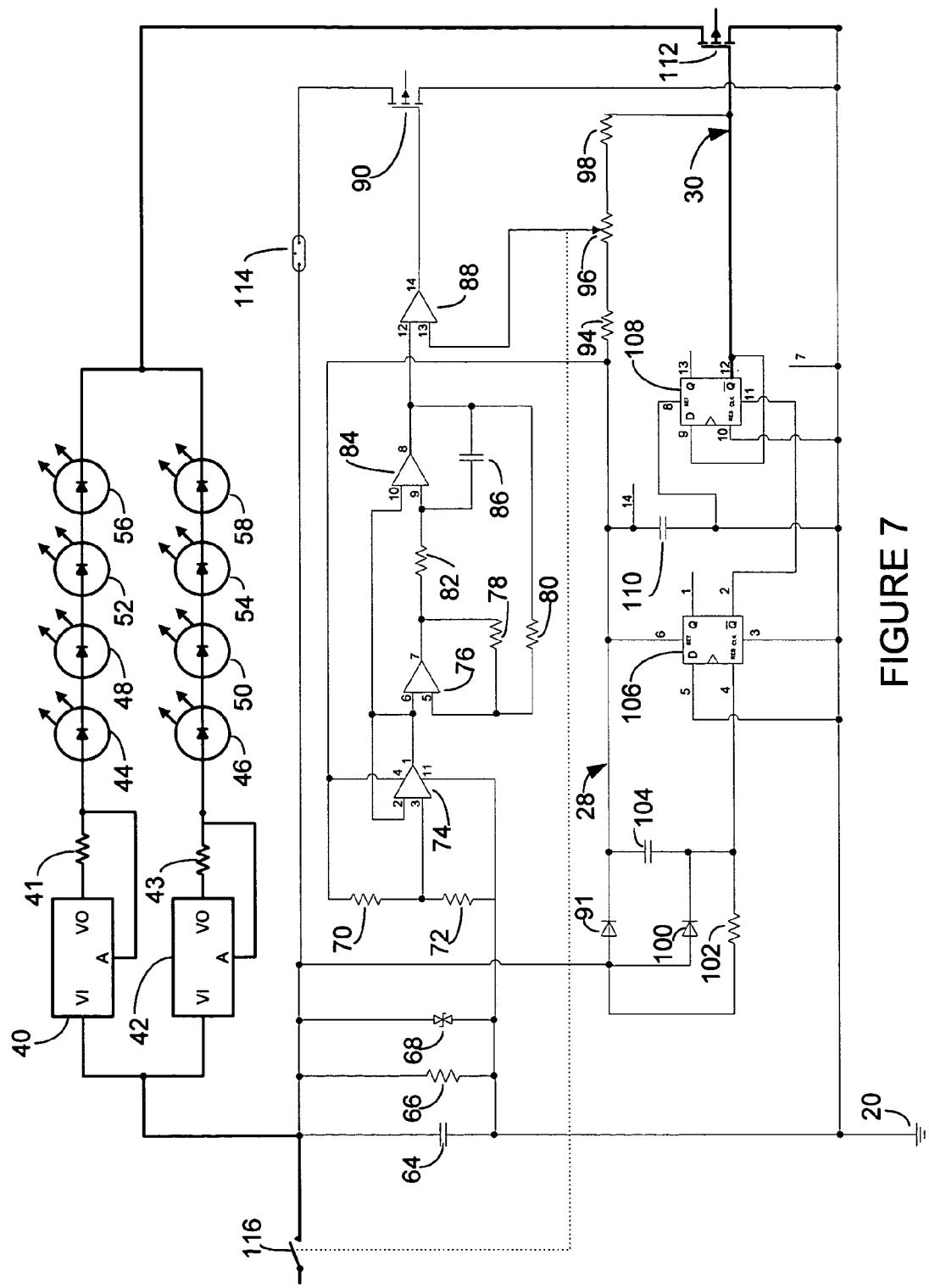
FIG. 7 is a schematic diagram of the circuitry of an embodiment of the invented dome light with bold lines showing the activity of the red light-emitting diodes.

The operation of the red LEDs 44, 46, 48, 50, 52, 54, 56, 58, is shown in FIG. 7. When the switch 116 is toggled so that the output $Q^-$, pin 12, of the second flip-flop 108 is high, this output turns on the second MOSFET 112, allowing current to flow through the second MOSFET. When the second MOSFET 112 is turned on, current flows through the red LEDs 44, 46, 48, 50, 52, 54, 56, 58, and they illuminate, emitting red light.

The red LEDs 44, 46, 48, 50, 52, 54, 56, 58, are arranged in two groups in one embodiment, with the LEDs in each group in series with each other and with a constant current source; these two series are in parallel with each other. This ensures that even if there is a failure in one of the two series, the other series will still function, and four of the eight red LEDs 44, 46, 48, 50, 52, 54, 56, 58 will still emit red light, illuminating the helm.

The two constant current sources control the illumination intensity of the red LEDs 44, 46, 48, 50, 52, 54, 56, 58. Each constant current source is comprised of either a first variable voltage regulator 40 or second variable voltage regulator 42, part number LM317T in one embodiment, and either a fourth resistor 41 or a fifth resistor 43. These constant current sources set the current levels to a fixed value, thirty milliamperes in one embodiment, regardless of fluctuations in the power supply. The constant current ensures a constant illumination and long life, approximately one hundred thousand hours in one embodiment, for the red LEDs 44, 46, 48, 50, 52, 54, 56, 58. The current regulator could be replaced with a resistor. However, without the current regulator, the illumination level would fluctuate with the supply voltage, and the expected lifetime of the red LEDs 44, 46, 48, 50, 52, 54, 56, 58 would be reduced.

Figure 8:
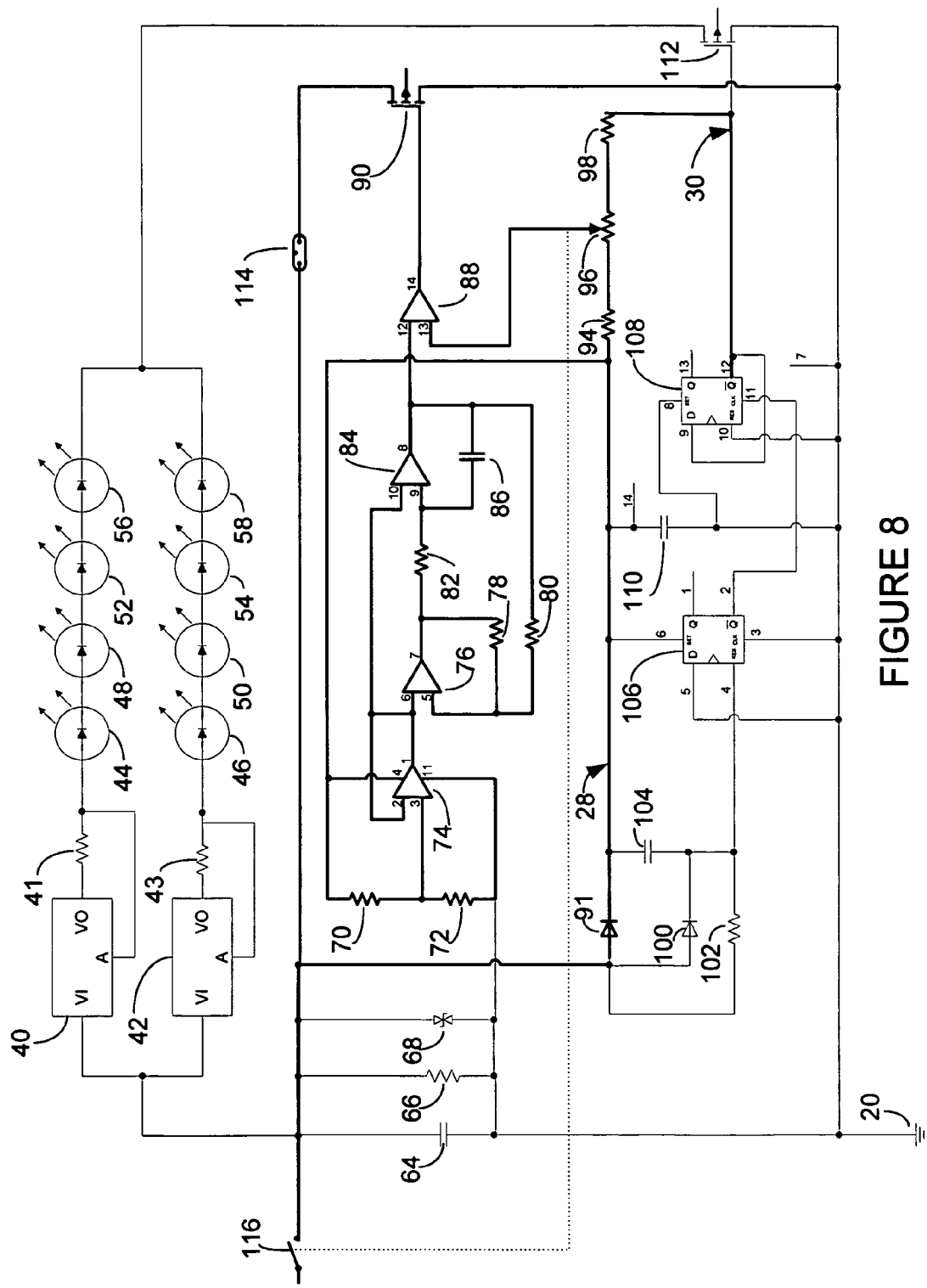
FIG. 8 is a schematic diagram of the circuitry of an embodiment of the invented dome light with bold lines showing the activity of the halogen bulb and the pulse width modulation regulator.
Figure 9:
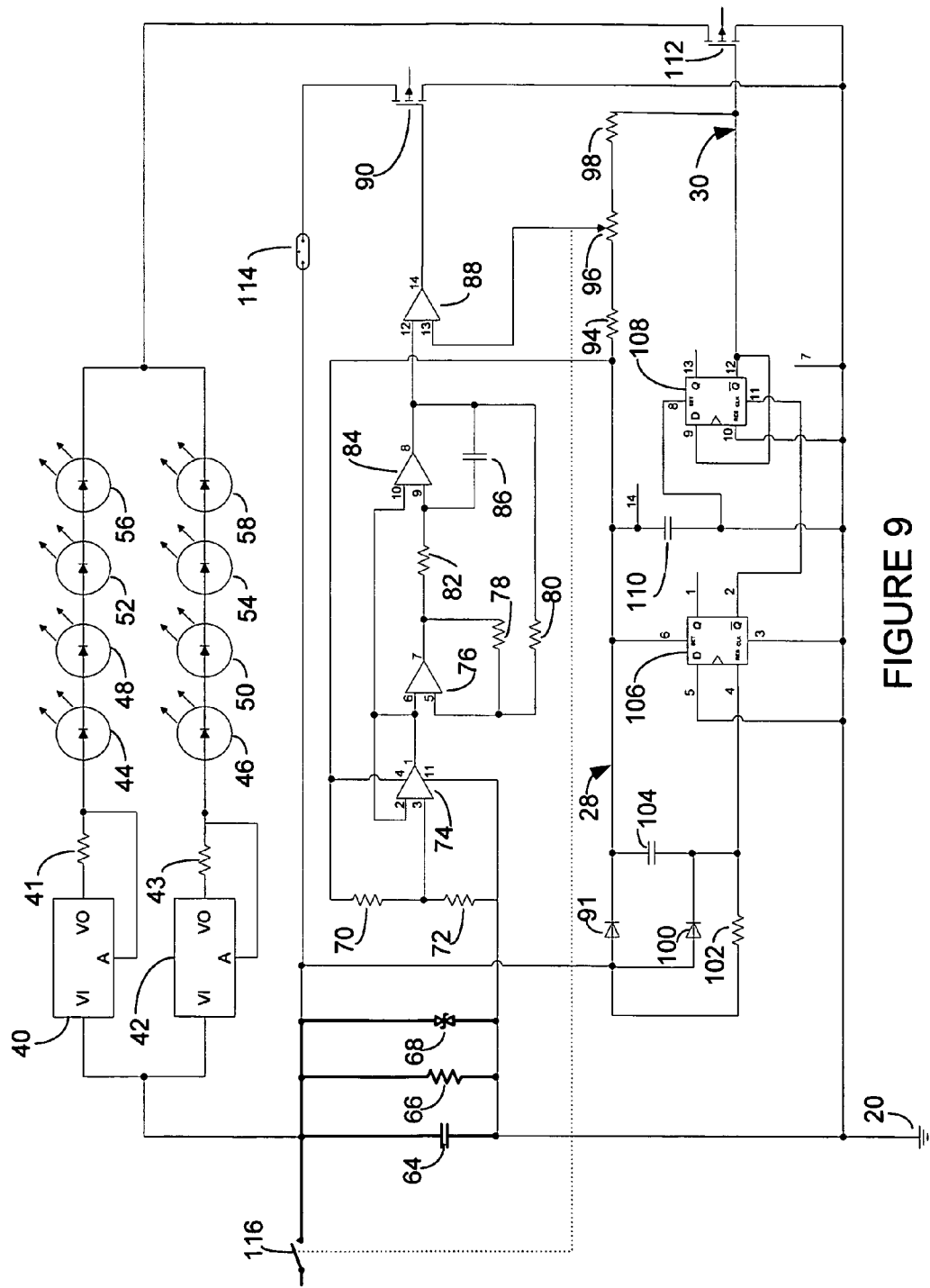
FIG. 9 is a schematic diagram of the circuitry of an embodiment of the invented dome light with bold lines showing the activity of a capacitor, resistor, and transient suppressor, which collectively protect the components from electrical surges and noise from the DC power supply.

FIG. 8 shows the operation of the pulse width modulator to control the illumination intensity of the halogen bulb 114. The pulse width modulator uses a plurality of operational amplifiers, resistors, and a capacitor to create a duty cycle of pulses during which the halogen bulb 114 switches from an on or illuminating state to an off or non-illuminating state. The pulse width modulator controls this duty cycle, which is the average duration within each cycle that the first MOSFET 90 is on and the halogen bulb 114 is illuminating. The duty cycle can be varied from zero, meaning that the first MOSFET 90 is always off, to one-hundred percent, meaning that the first MOSFET 90 is always on. A fifty-percent duty cycle would mean that the first MOSFET 90 is on for half of each cycle and that the halogen bulb 114 is illuminating for half of the duration of each cycle.

The primary advantage of using the pulse width modulator is reduced power loss: rather than reducing the illumination intensity of the halogen bulb 114 by drawing power away from the halogen bulb 114, the pulse width modulator turns the halogen bulb 114 off for fractions of a second during each cycle, reducing power consumed from the power source. For example, if the pulse width modulation system shown were used to reduce the power to the halogen bulb 114 to fifty percent of the available power, then fifty percent of the available power would be used by the halogen bulb 114, and one percent would be used to operate the pulse width modulator, for a total power dissipation of fifty-one percent of the available power. In contrast, if a linear power controller or linear voltage regulator were used to allow a load (such as a halogen bulb) to utilize fifty percent of the available power, then thirty percent of the available power would be used to operate the linear controller or regulator, for a total power dissipation of eighty percent of the available power. This increased energy efficiency is of great benefit for a dome light 10 that uses a twelve-volt battery system and is part of a boat that is isolated from power sources. Thus, the combination of the pulse width modulator and halogen bulb is useful independent of the red LEDs 44, 46, 48, 50, 52, 54, 56, 58, and sequential logic sequencing.

In one embodiment, the pulse width modulator uses an LM2902, which consists of four independent, high gain, internally frequency compensated operational amplifiers. The pulse width modulator also uses a sixth resistor 72, 100 kΩ, which is connected to ground and ground pin 11 of the LM2902 at one end, and to input pin 3 of the first operational amplifier 74 at the other end; a seventh resistor 70, 100 kΩ, which is connected to input pin 3 of the first operational amplifier 74 at one end, and to supply voltage pin 4 and the third node 28 at the other end; a eighth resistor 78, 100 kΩ, which is connected to output pin 7 of the second operational amplifier 76 at one end, and to input pin 5 of the second operational amplifier 76 at the other end; a ninth resistor 80, 49.9 kΩ, which is connected to input pin 5 of the second operational amplifier 76 at one end, and to output pin 8 of the third operational amplifier 84 at the other end; a tenth resistor 82, 100 kΩ, which is connected to output pin 7 of the second operational amplifier 76 at one end, and to input pin 9 of the third operational amplifier 84 at the other end; third capacitor 86, 0.01 µF, which is connected to input pin 9 of third operational amplifier 84 at one end, and to output pin 8 of third operational amplifier 84 at the other end.

Output pin 1 of the first operational amplifier 74 is connected to the input pin 2 of first operational amplifier 74, input pin 6 of second operational amplifier 76, and to input pin 10 of third operational amplifier 84. Output pin 8 of third operational amplifier 84 is connected to input pin 12 of fourth operational amplifier 88. Output pin 14 of fourth operational amplifier 88 is connected to first MOSFET 90, which controls the halogen bulb 114. Transistor types other than MOSFETs could also be used. Input pin 13 of fourth operational amplifier 88 is connected to the potentiometer 96, maximum resistance 10 kΩ, which controls the pulse width. The potentiometer 96 is also connected to the first resistor 94, 4.53 kΩ, and to second resistor 98, 1.96 kΩ. The ends of first resistor 94 and second resistor 98 that are not connected to the potentiometer 96 are connected to the third node 28 and second node 30, respectively.

The pulse width modulation system converts the DC input voltage received through the switch 116 and first diode 91 into an AC output voltage. The duty cycle, or pulse width of the on time of the AC output voltage, is controlled by the voltage potential of input pin 13 of fourth operational amplifier 88; the voltage potential of input pin 13 is controlled by the resistor divider network of the first resistor 94, potentiometer 96, and the second resistor 98.

The process for converting the DC input voltage into an AC output voltage is as follows. First operational amplifier 74 is configured as a buffer amplifier, with the voltage of output terminal 1 determined by the voltage divider network of seventh resistor 70 and sixth resistor 72. Because seventh resistor 70 and sixth resistor 72 have equal resistance values, and are the only resistive components between the switch 116 and ground 20, the voltage potential at input pin 3 between seventh resistor 70 and sixth resistor 72 is half the DC input voltage, or six volts in one embodiment. The six volt potential at input pin 3 is used as a virtual ground for the second operational amplifier 76 and the third operational amplifier 84.

The second operational amplifier 76, tenth resistor 82, eighth resistor 78, ninth resistor 80, and third capacitor 86, create an RC circuit. Second operational amplifier 76 effectively becomes an astable multivibrator, creating a square wave at output terminal 7 with a frequency in the range of 450 Hz to 460 Hz. This frequency of the square wave is determined by the time constraints defined by tenth resistor 82, eighth resistor 78, ninth resistor 80, and third capacitor 86.

Third operational amplifier 84 is configured as an integrator. Input pin 10 of third operational amplifier 84 receives the signal from output pin 1 of first operational amplifier 76; input pin 9 of third operational amplifier 9 receives the square wave signal created by the RC circuit of second operational amplifier 76, tenth resistor 82, eighth resistor 78, ninth resistor 80, and third capacitor 86. Output pin 8 of third operational amplifier 84 converts the square wave signal into a triangular waveform. The integration time of third operational amplifier 84 is determined by the values of tenth resistor 82 and third capacitor 86.

Fourth operational amplifier 88 is configured as a comparator, and converts the triangular waveform output of third operational amplifier 84 into a variable pulse width square waveform. The pulse width of this square waveform at output pin 14 is determined by the reference voltage of input pin 13 of the fourth operational amplifier 88.

The reference voltage of input pin 13 is determined by the resistor divider network of first resistor 94, potentiometer 96, and second resistor 98. First resistor 94 and second resistor 98 determine the operational limits of the reference voltage potential at input pin 13: first resistor 94 is set for the minimum pulse width that will just turn the halogen bulb 114 on, and second resistor 98 is set for the maximum pulse width, one hundred percent duty cycle, for maximum illumination by the halogen bulb 114. The potentiometer 96 controls the pulse width of the signal sent by output pin 14 of fourth operational amplifier 88 to the first MOSFET 90. The first MOSFET 90 determines when the halogen bulb 114 is illuminating: depending on the duty cycle, the halogen bulb 114 can be illuminating from zero percent to one hundred percent of each cycle, with 450 to 460 cycles occurring each second.

The frequency need not be 450 to 460 Hz, but could be any value greater than sixteen Hertz. Because the human eye sees only sixteen frames per second, the halogen bulb 114 will not appear to flicker, but will appear to be constantly on with varying levels of brightness depending on what fraction of each cycle that the halogen bulb 114 is illuminating.

When the switch 116 is toggled so that output $Q^-$, pin 12 of second flip-flop 108 is low, the pulse width modulator is enabled. With the pulse width modulator enabled, the first MOSFET 90 will be turned on during the on portions of the duty cycle, when the voltage potential of pin 14 of the fourth operational amplifier 88 is high, and the halogen bulb 114 receives power and can be dimmed to the desired illumination intensity. When the output $Q^-$, pin 12 of second flip-flop 108 is low, the reference voltage of input pin 13 of fourth operational amplifier 88 is fully adjustable by the potentiometer 96, enabling the operation of the pulse width modulator. When the switch 116 is toggled so that output $Q^-$, pin 12, of second flip-flop 108 is high, the pulse width modulator will be disabled, the first MOSFET 90 will be turned off, and no current will flow through the halogen bulb 114. When the output $Q^-$, pin 12 of second flip-flop 108, is high, the reference voltage of input pin 13 of fourth operational amplifier 88 will be equal to the supply voltage at the switch 116, twelve volts DC in this embodiment, and the pulse width modulator will be disabled, turning off the first MOSFET 90 and preventing the halogen bulb from drawing power. When the output $Q^-$, pin 12 of second flip-flop 108, is high, second MOSFET 112 will be turned on, allowing current to flow through second MOSFET 112 and the red LEDs 44, 46, 48, 50, 52, 54, 56, 58, causing the red LEDs 44, 46, 48, 50, 52, 54, 56, 58, to emit red light. In this situation, the potentiometer 96 has no effect on the circuit, and the red LEDs 44, 46, 48, 50, 52, 54, 56, 58, are constantly illuminating at the intensity determined by the constant current source.

Fourth capacitor 64, 220 µF with an operating voltage of fifty volts DC, eleventh resistor 66, 1.0 kΩ, and transient suppressor 68, the latter of which has a capacity of twenty volts DC and 1,500 watts in one embodiment, protect the electronic components from electrical surges and noise from the DC power supply. The fourth capacitor 64, eleventh resistor 66, and transient suppressor 68, are all connected in parallel to each other with one node connected to the switch 116 and the other node connected to the ground 20. Transient suppressor 68 quickly suppresses transient energy; fourth capacitor 64 suppresses noise. Eleventh resistor 66 dissipates energy stored in fourth capacitor 64 when the switch 116 opens.

While one embodiment of the dome light 10 has been described, other designs are envisioned which would still achieve the goals of the invention. Accordingly, the scope of the invention is not limited by the above-described particulars, but covers all embodiments and equivalents within the scope of the following claims.

What is claimed is:

1. An electrical circuit comprising:
   a plurality of light-emitting diodes;
   a bulb; and
   a switch with only two modes, said modes consisting of on and off;
   wherein the circuit is configured to cycle through three states in response to a change in the switch's modes, in the following order: the plurality of light-emitting diodes off and the bulb off, the plurality of light-emitting diodes on and the bulb off, the plurality of light-emitting diodes off and the bulb off, the plurality of light-emitting diodes off and the bulb on, and the plurality of light-emitting diodes off and the bulb off.

2. The electrical circuit of claim 1 wherein the plurality of light-emitting diodes are red light-emitting diodes and the bulb is a halogen bulb.

3. The electrical circuit of claim 2 wherein the circuit further comprises at least two flip-flops which are configured to cause the circuit to cycle through the three states in response to a change in the modes of the switch.

4. The electrical circuit of claim 2 wherein the circuit further comprises at least two flip-flops and at least two transistors which are configured to cause the circuit to cycle through the three states in response to a change in the modes of the switch.

5. An electrical circuit comprising:
   a halogen bulb; and
   a pulse width modulation regulator;
   wherein an apparent illumination intensity of the halogen bulb is controlled by a width of pulses generated by the pulse width modulation regulator;
   wherein the pulse width modulation regulator is configured to generate a square wave from a DC input, convert said square wave into a triangular waveform, and convert said triangular waveform into a variable pulse width waveform.

6. The electrical circuit of claim 5 wherein the pulse width modulation regulator comprises a plurality of operational amplifiers and a capacitor.

7. The electrical circuit of claim 6 further comprising a first transistor which is configured to allow or prevent current from flowing through the halogen bulb, wherein the first transistor is controlled by an output of one of said plurality of operational amplifiers.

8. The electrical circuit of claim 7 further comprising:
   a switch with only two modes, said modes consisting of on and off; and
   a plurality of light-emitting diodes;
   wherein the circuit is configured to cycle through three states in response to input from the switch in the following order: halogen bulb off and light-emitting diodes off, halogen bulb on and light-emitting diodes off, halogen bulb off and light-emitting diodes off, halogen bulb off and light-emitting diodes on, halogen bulb off and light-emitting diodes off.

9. The electrical circuit of claim 8 wherein the plurality of light-emitting diodes are a plurality of red light-emitting diodes.

10. The electrical circuit of claim 9 further comprising:
    a second transistor which is configured to allow or prevent current from flowing through the plurality of red light-emitting diodes;
    a first flip-flop; and
    a second flip-flop;
    wherein the first flip-flop and second flip-flop are configured to control a gate of the second transistor.

11. The electrical circuit of claim 10 further comprising:
    a potentiometer;
    wherein the potentiometer is configured to dim the output of the halogen lamp by changing the width of the pulses generated by the pulse width modulation regulator.

12. A circuit comprising:
    a halogen bulb; and
    a pulse width modulator;
    wherein the pulse width modulator is configured to convert a DC input into an AC output with a frequency greater than sixteen hertz;

wherein the pulse width modulator is further configured to control a duration that the halogen bulb is on within each cycle.

13. The circuit of claim 12 wherein the pulse width modulator comprises operational amplifiers.

14. The circuit of claim 13 wherein the pulse width modulator controls a transistor which determines whether current may flow through the halogen bulb.

15. The circuit of claim 14 further comprising:
a switch which is configured to determine whether the halogen bulb receives the DC input; and
a potentiometer which controls the duration that the halogen bulb is on within each cycle.

16. The circuit of claim 15 further comprising:
a plurality of red light-emitting diodes;
wherein the circuit further comprises two flip-flops which cause the circuit to cycle through the following states in the following order in response to changes in the status of the switch: halogen bulb off and red light-emitting diodes off, halogen bulb on and red light-emitting diodes off, halogen bulb off and red light-emitting diodes off, halogen bulb off and red light-emitting diodes on, halogen bulb off and red light-emitting diodes off.

17. The circuit of claim 15 further comprising:
a plurality of light-emitting diodes;
wherein the circuit is configured to allow either the light-emitting diodes or the halogen bulb to illuminate, and is further configured to not allow the light-emitting diodes and the halogen bulb to illuminate at the same time.

18. The circuit of claim 17 wherein the plurality of light-emitting diodes are a plurality of red light-emitting diodes.

19. The circuit of claim 15 further comprising:
a plurality of red light-emitting diodes;
wherein the circuit is configured to use CMOS logic to cycle through the following states in the following order in response to changes in the status of the switch: halogen bulb off and red light-emitting diodes off, halogen bulb on and red light-emitting diodes off, halogen bulb off and red light-emitting diodes off, halogen bulb off and red light-emitting diodes on, halogen bulb off and red light-emitting diodes off.

20. The circuit of claim 16 wherein the circuit is installed on a boat.

* * * * *